US010046713B2

(12) United States Patent
Maranville et al.

(10) Patent No.: US 10,046,713 B2
(45) Date of Patent: Aug. 14, 2018

(54) SENSOR APPARATUS (71) Applicant: Ford Global Technologies, LLC, Dearborn, MI (US)

(72) Inventors: Clay Wesley Maranville, Ypsilanti, MI (US); Douglas Scott Rhode, Farmington Hills, MI (US); Rick H. Wykoff, Commerce Township, MI (US); Randal Henry Visintainer, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 108 days.

(21) Appl. No.: 14/986,841

(22) Filed: Jan. 4, 2016

(65) Prior Publication Data

US 2017/0190300 A1    Jul. 6, 2017

(51) Int. Cl.
*B60R 11/00* (2006.01)
*B60R 9/04* (2006.01)
*B62D 25/06* (2006.01)
*G01S 13/93* (2006.01)

(52) U.S. Cl.
CPC .......... *B60R 11/00* (2013.01); *B60R 9/04* (2013.01); *B62D 25/06* (2013.01); *B60R 2011/0028* (2013.01); *G01S 2013/9367* (2013.01); *G01S 2013/9382* (2013.01)

(58) Field of Classification Search
CPC ......... G01S 17/93; G01S 13/93; B62D 25/06; B60R 11/00
USPC ...................................... 296/216.01–224, 210
See application file for complete search history.

(56) References Cited

U.S. PATENT DOCUMENTS

| | | | |
|---|---|---|---|
| 5,540,478 A * | 7/1996 | Schuch | B60J 7/04 224/331 |
| 6,493,920 B1 | 12/2002 | Hill et al. | |
| 6,623,069 B2 | 9/2003 | Grimm | |
| 7,021,704 B2 | 4/2006 | Ortega Martinez et al. | |
| 7,337,650 B1 * | 3/2008 | Preston | B60W 40/11 73/1.38 |
| 9,600,768 B1 * | 3/2017 | Ferguson | G06N 5/02 |
| 2003/0159264 A1 | 8/2003 | McLeod et al. | |
| 2007/0085386 A1 * | 4/2007 | Zirbs | B62D 25/06 296/218 |
| 2011/0226927 A1 * | 9/2011 | Sato | H01Q 1/1214 248/534 |
| 2015/0307026 A1 * | 10/2015 | Minikey, Jr. | B60R 11/04 348/148 |
| 2016/0236725 A1 * | 8/2016 | Shirai | B62D 29/008 |

FOREIGN PATENT DOCUMENTS

DE        102004029740 A1    2/2006

OTHER PUBLICATIONS

Hessler, "Multipanel roof systems", SAE International, http://articles.sae.org/7882/, 2 pages.

* cited by examiner

*Primary Examiner* — Dennis H Pedder
(74) *Attorney, Agent, or Firm* — Frank A. MacKenzie; Bejin Bieneman PLC (57) ABSTRACT

A vehicle roof mount includes at least one datum feature. The datum feature is provided according to at least one datum. The at least one datum is determined according to a specified orientation of a sensor included in a sensor frame. The sensor frame is mateable to the roof mount.

14 Claims, 7 Drawing Sheets

SENSOR APPARATUS

BACKGROUND

Vehicles include sensors to support various operations. Often, sensors must be aligned in a specific orientation for accuracy and/or proper operation. For example, vehicle sensors typically depend on a predetermined location and/or orientation, e.g., one or more angles with respect to horizontal and/or vertical axes, a position one the vehicle and/or with respect to vehicle parts, e.g., a distance from a bumper, pillar, roofline, beltline, etc. Due to variability of sensor assembly and/or component tolerance, the location of sensors may vary in conventional manufacturing and assembly processes. For example, a sensor may require a specific location with respect to 3-dimensional axial coordinates, e.g., X, Y, and Z axes, and an orientation at three angles with respect to the axes, e.g., $\theta$, $\phi$, $\psi$, i.e., there are 6 degrees of freedom. A vehicle includes several components, each with its own tolerance for location error. These tolerances add up as more components are included in the vehicle. Therefore, sensors may have significant variation of their location upon installation. As such, alignment of the sensors is typically difficult. Sensors that are installed and calibrated individually require additional time for installation, calibration, assurance of correct orientation, etc., during manufacture.

DETAILED DESCRIPTION

Sensors in a vehicle such as an autonomous vehicle may require a specific alignment with a vehicle body. Aligning the sensors may be difficult and expensive. By prefabricating an assembly with precalibrated sensors that fits into a vehicle roof mount, the sensors may be easily installed and aligned with the vehicle body. The assembly generally limits some of this variability in sensor location and/or orientation. The assembly may be constructed to fit within existing vehicle roof mounts, allowing for retro-fitting of current vehicles and easier installation into new vehicles.

Figure 1:
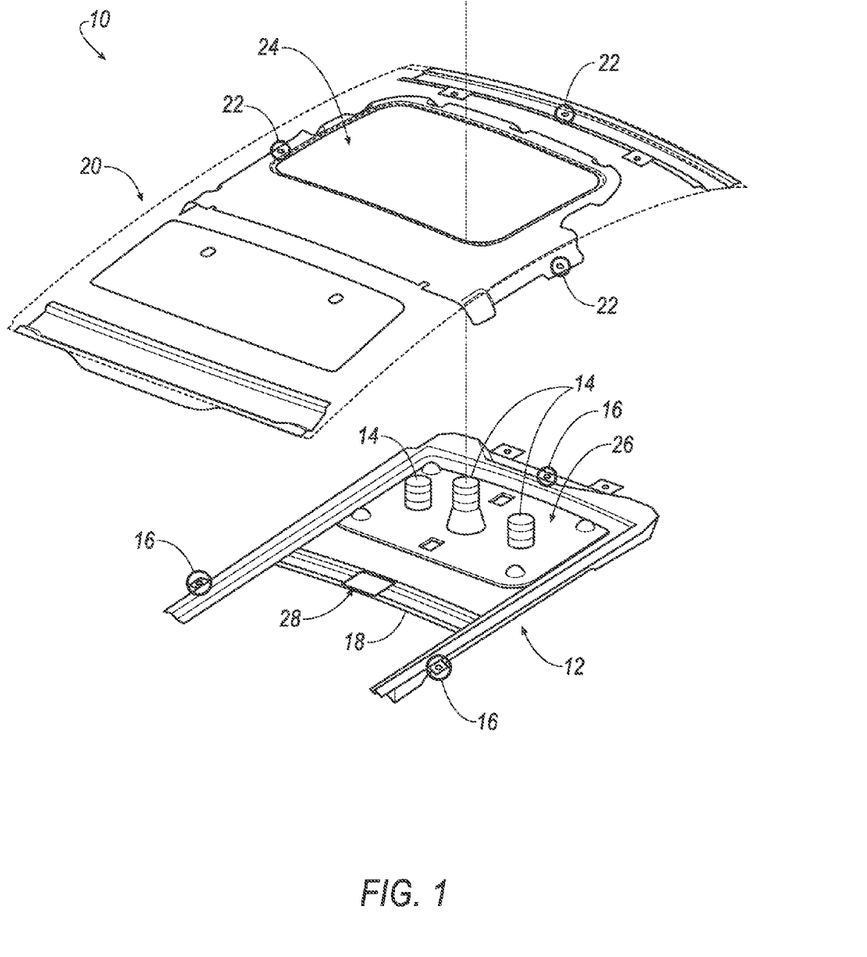
FIG. 1 is a view of an example system for aligning sensors in a roof mount.

FIG. 1 illustrates an exemplary system 10 in a vehicle 50. The system 10 includes a sensor frame 12 having sensors 14, feature-locating elements 16, a support rail 18, a sensor mount 26, and module locations 28. The system 10 further includes a roof mount 20 having datum features 22 and a cavity 24. The system 10 is configured to align the sensors 14 with a vehicle body 52.

The sensor frame 12 is fittable into the roof mount 20 in an orientation that is aligned with the vehicle body 52. The sensor frame 12 may be manufactured prior to installation in the roof mount 20, which is a structure that can be provided in a roof location of the vehicle body 52 to receive and/or support various elements of a vehicle roof, including the sensor frame 12.

The sensor frame 12 includes at least one sensor 14. The sensors 14 may include, e.g., radar, lidar, and a vision system. The sensors 14 may be communicatively coupled, e.g., via a wired and/or wireless connection such as is known, with a communications bus in the vehicle 50. The sensors 14 may be arranged to be aligned with the vehicle body 52 or otherwise oriented in a specific manner when the sensor frame 12 is installed into the roof mount 20. Examples of sensors 14 that should be oriented in a specific manner include, e.g., lidar sensors, which as is known typically require a specified the position and orientation of the vehicle body to avoid interference during operation of the vehicle 50 and/or to provide useful data. The sensors 14 may include, by way of example and not limitation, lidar, radar, vision systems, microphones, radio-frequency directional antennas, and directional ultrasonic sensors. The sensors 14 may be supported by the sensor mount 26 and/or the support rail 18.

The sensor frame 12 includes at least one feature-locating element 16. The roof mount 20 includes at least one datum feature 22 aligned with a datum, and the feature-locating elements 16 are mateable with the datum features 22 to align the sensor frame 12 with the rest of the vehicle body 52. The term "datum" as used herein is intended to have the meaning used in the known Y14.5-2009 standard promulgated by the American Society of Mechanical Engineers (ASME), published in Dimensioning and Tolerancing, ASME y14.5-2009; NY: American Society of Mechanical Engineers (2009). According to that standard, a "datum" is "a theoretically exact point, axis, or plane derived from the true geometric counterpart of a specified datum feature. A datum is the origin from which the location or geometric characteristics of features of a part are established." In the present context, a datum typically defines a point, line or shape (i.e., portion of a plane) that defines a location in and/or orientation according to which the sensor frame 12 attaches, or is to attach, to the roof mount 20. The sensor frame 12 may be aligned with the vehicle body 52 via respective datum features 22 and feature-locating elements 16. That is, the roof mount 20 may have predetermined datums arranged to align the roof mount 12 with the vehicle body 52, which aligns the sensors 14 with the vehicle body 52.

The datum is indicated by datum features 22 on the roof mount 20 that, as discussed below, can receive a feature-locating element 16, which allows for controlled, fine-tolerance positioning of the sensor frame 12 in the roof mount 20. The feature-locating elements 16 may be physical structures arranged to mate with the datum features 22, e.g., a pin and/or a flat, a "flat" being a pin with a flattened side to, e.g., receive a set screw. A datum feature 22 and a feature-locating element 16 are typically mateable by, e.g., a press fit, a threaded fastener, etc. The sensor frame 12 may include at least three feature-locating elements 16. The feature-locating elements 16 align the sensor frame 12 to the roof mount 20, securing the alignment of the sensors 14 and easing installation of the sensor frame 12.

The sensor frame 12 includes at least one support rail 18. The support rails 18 may protect the sensors 14 and the feature-locating elements 16. The support rails 18 may house the module locations 28. The support rails 18 may be, e.g., longitudinal rails and/or cross-rails.

The sensor mount 26 houses the sensors 14, and, additionally or alternatively to the roof mount 20, can include one or more datum features 22. The sensor mount 26 may be, e.g., a structure configured to house the sensors 14 to retain their alignment upon installation of the sensor frame 12. The sensor mount 26 may be constructed of, e.g., metal, acrylic, polycarbonate, glass, etc. The sensor mount 26 may be supported by and/or attached to the support rails 18.

The sensor frame 12 includes at least one module location 28. The module locations 28 may be located on, e.g., the support rails 18 and/or the sensor mount 26. The module locations 28 may include receptacles or the like as are known to receive a vehicle component, e.g., a wiring harness and/or a thermal management interface. For example, a wire harness and cooling line may be routed up a vehicle 50 pillar, e.g., the C-pillar, and connect to the sensors 14. The module locations 28 may face an interior of the vehicle 50, e.g., a bottom of the sensor frame 12.

The roof mount 20 is a structure typically attachable to the vehicle body 52 and houses the sensor frame 12. The roof mount 20 advantageously retains respective orientations, i.e., positions and/or angles, of the sensors 14 when the sensor frame 12 is installed into the roof mount 20.

The roof mount 20 may include at least one datum feature 22 as stated above. One or more datum features 22 allow the sensor frame 12 to be installed into the roof mount quickly and accurately. The datum features 22 are physical structures in the roof mount 20, e.g., slots, annuli, circular cavities, cutouts from the structure of the roof mount, etc., arranged to receive the feature-locating elements 16. For example, a datum feature 22 may be a circular slot arranged to receive a cylindrical feature-locating element in the roof mount 20. The datum features 22 can receive the feature-locating elements 16 to position the sensor frame 12 in the cavity 24 and with respect to the roof mount 20.

Figure 6:
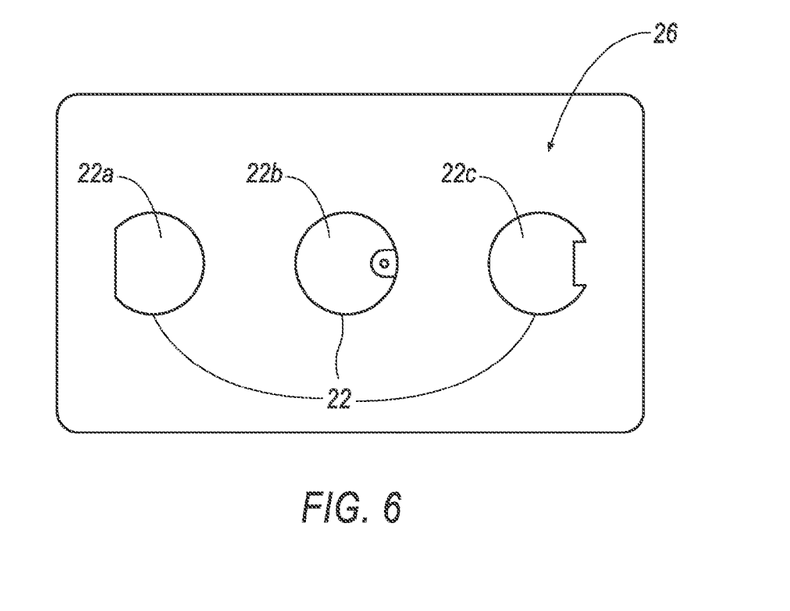
FIG. 6 is a view of datum features in the sensor mount of FIG. 5.

The roof mount 20 may include at least three datum features 22. For example, where one of the datum features 22 is a circular slot, the datum feature 22 thereby prevents motion along two of three directional axes and prevents rotation in two of three directions when a feature-locating element 16, e.g., a cylindrical pin, is placed in the datum feature 22, i.e., the circular slot. However, a datum feature 22 that is a circular slot may allow for movement along the axis of the circle defining the circular slot, i.e., the datum feature 22, and may allow rotation around the axis. To prevent such rotation, one of the datum features 22 may include a flat edge or a notch added to the circular slot in the roof mount 20, e.g., as shown in FIG. 6 as datum features 22a (having a flat edge) and 22c (having a notch). The flat edge or notch prevents rotation about the axis, resulting in five degrees of freedom constrained, i.e., only vertical movement along the axis of the datum is allowed. Another datum feature 22 may include a slot for a pin, as shown in FIG. 6 as datum feature 22b, which would constrain the vertical axial motion, resulting in six degrees of freedom constrained. However, it is generally desired for the datum feature 22 to constrain movement of the roof mount 20 with respect to the sensor frame 12 in at most five of six possible degrees of freedom, the reason being that constraining in six or more degrees of freedom can result in over-constraining and stack-up tolerance errors. In any case, the feature-locating elements 16 may be shaped to mate with the datum features 22, providing a specific orientation for the sensor frame 12 to attach to the roof mount 20. When the sensor frame 12 is attached to the roof mount 20 via the datum features 22, the sensor frame 12 may be sealed to the roof mount 20 with, e.g., an adhesive and/or a rubber seal.

The roof mount 20 includes the cavity 24. The cavity 24 may be, e.g., a cavity configured to house mechanisms such as are known for a moon roof and/or a panoramic roof. The cavity 24 may house the sensor mount 26 when the sensor frame 12 is installed into the roof mount 20. The sensor mount 26 may be sized to fit within the cavity 24.

Figure 2:
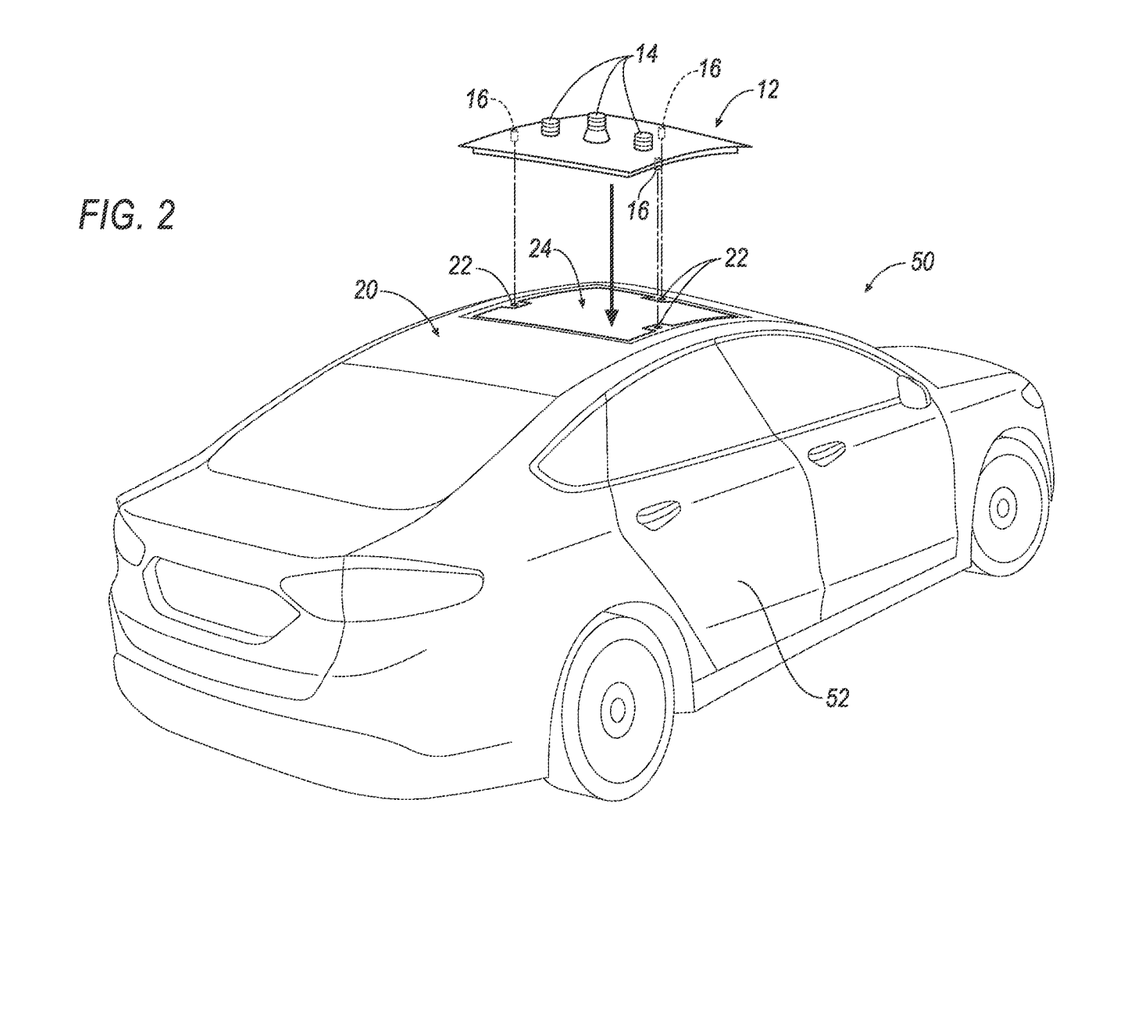
FIG. 2 is a view of the system of FIG. 1 top-loading the sensors into an example roof mount.

FIG. 2 illustrates the sensor frame 12 top-loaded into the roof mount 20, here a moon roof. The term "top-loaded" means that the sensor frame 12 is installed in the roof mount 20 from the top in a vertical direction, i.e., the sensor frame 12 is lowered from above into the roof mount 20. The feature-locating elements 16 may be located toward the bottom of the sensor frame 12, and the datum features 22 may be arranged along the top of the roof mount 20 to receive the feature-locating elements 16. When the feature-locating elements 16 mate with the datum features 22, the sensor mount 26 and the sensors 14 may be aligned with the vehicle body 52. The mounting plate 12 may then be attached to the roof mount with, e.g., an adhesive seal, e.g., urethane. The sensor frame 12 may be arranged to top-load into the roof mount 20 based on, e.g., the datums, the orientation of the sensors 14, manufacturing techniques, etc.

The mounting plate 12 may be installed in a vehicle 50 that has the moon roof removed, creating the cavity 24 in which the sensor mount 26 is placed. Thus, the sensor frame 12 may be retro-fitted into existing vehicles. The sensor frame 12 may also be installed into existing roof mounts 20 designed for a moon roof, and thus special manufacturing may not be required.

Figure 3:
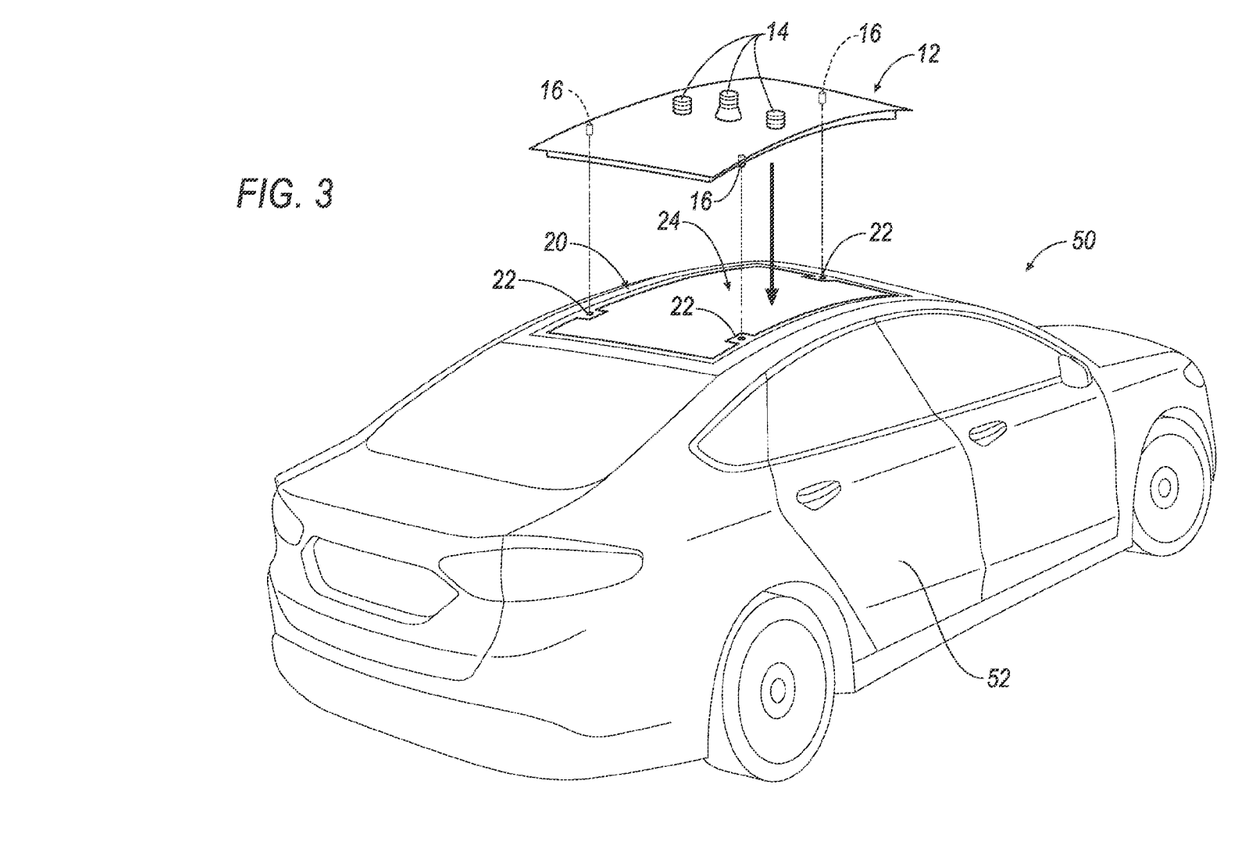
FIG. 3 is a view of the system of FIG. 1 top-loading the sensors into another FIG. 1 roof mount.

FIG. 3 illustrates the sensor frame 12 top-loaded into another exemplary roof mount 20, here a panoramic roof. The panoramic roof may create a larger cavity 24 than the moon roof of FIG. 2. The sensor frame 12 may be similarly top-loaded, i.e., lowered into the cavity 24 from above and sealed to the roof mount 20. Because the cavity 24 is larger for a panoramic roof than for the moon roof of FIG. 2, the sensor mount 26 must be constructed to the larger cavity, and the mounting plate 12 may be arranged so that the sensors 14 are calibrated and aligned upon installation. Similarly, the datum features 22 and the feature-locating elements 16 are located to preserve the calibration and alignment of the sensors 14 upon installation of the sensor frame 12. Because the panoramic roof has a larger cavity 24, the sensor frame 12 may include more sensors 14.

Figure 4:
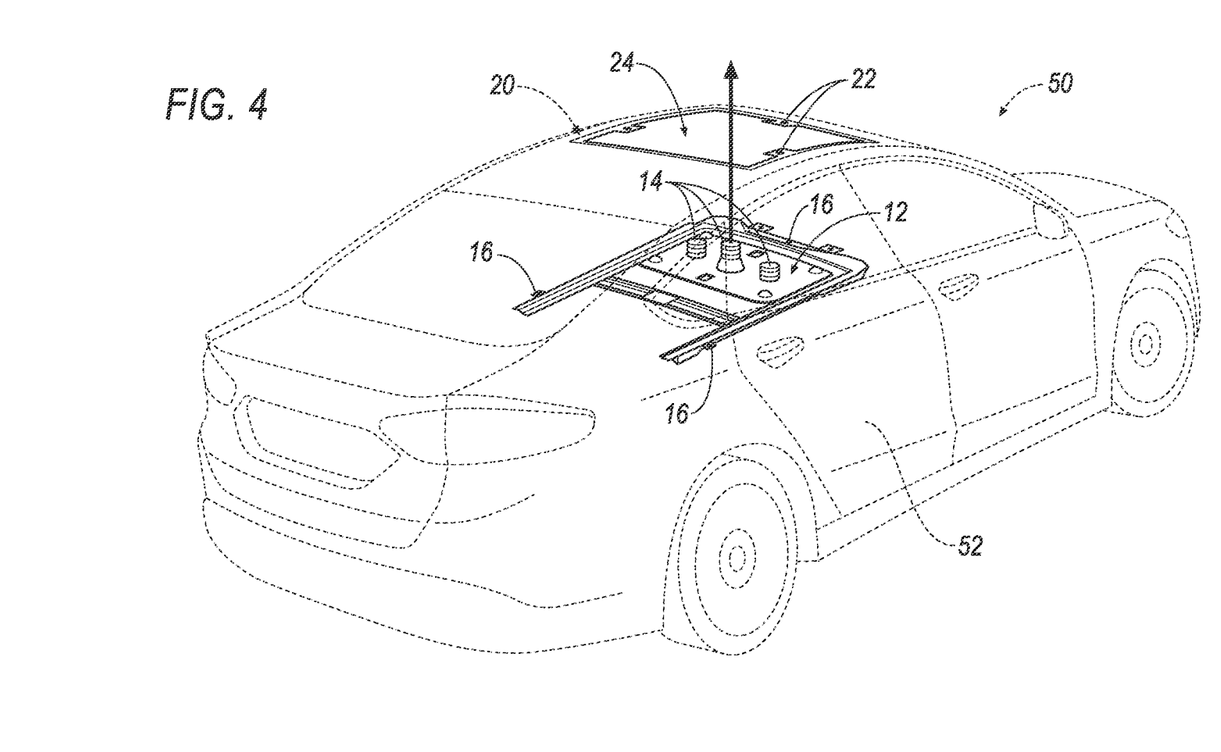
FIG. 4 is a view of the system bottom-loading the sensors into yet another FIG. 1 roof mount.

FIG. 4 illustrates the sensor frame 12 bottom-loaded into the roof mount 20. The term "bottom-loaded" means that the sensor frame 12 is installed in the roof mount 20 from the bottom in a vertical direction, i.e., the sensor frame 12 is raised from beneath the roof mount 20 and installed from below the roof mount 20. The feature-locating elements 16 may be arranged on the top of the sensor frame 12 to mate with the datum features 22 located on the bottom of the roof mount 20. The sensor frame 12 may be attached to the roof mount 20 with, e.g., a rubber seal. The sensor frame 12 may be arranged to bottom-load into the roof mount 20 based on, e.g., the datums, the orientation of the sensors 14, manufacturing techniques, etc.

Figure 5:
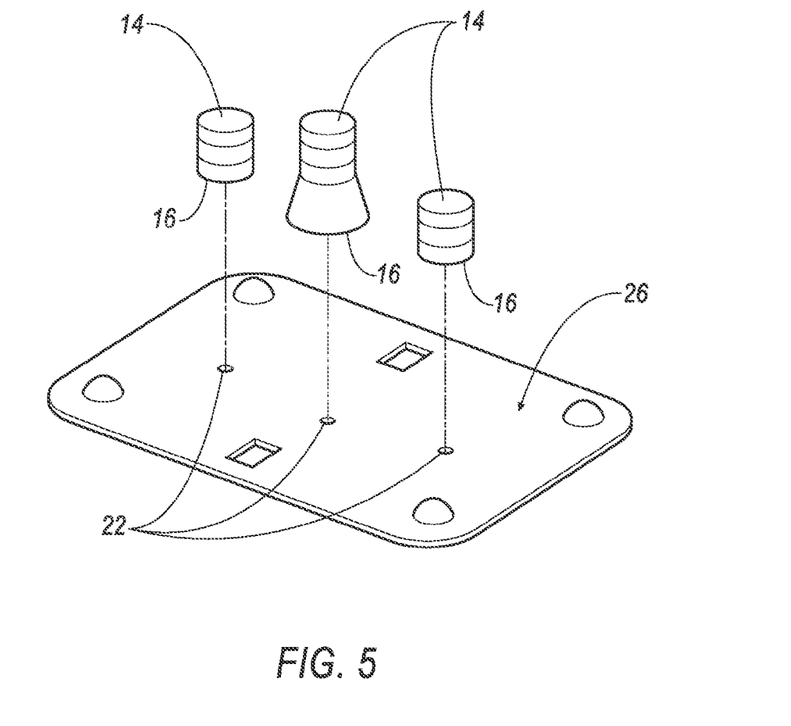
FIG. 5 is a view of a sensor mount as shown in FIG. 1.

FIG. 5 illustrates an example sensor mount 26. The sensor mount 26 includes the sensors 14. The sensors 14 are mateable with the sensor mount 26 via datum features 22 in the sensor mount 26 and feature-locating elements 16 in the sensors 14. The datum features 22 and feature-locating elements 16 may be selected to ensure proper orientation of the sensors 14 when installed in the vehicle 50.

FIG. 6 illustrates datum features 22 in the sensor mount 26, but may also be used in the roof mount 20. As described above, the datum features 22 include, e.g., a feature 22a having a substantially circular shape with a flattened edge, a feature 22b having a circular slot for a cylindrical pin, and a feature 22c having a rectangular notch included in the substantially circular shape. In this example, the feature 22a may prevent rotation of the sensor 14, but allows for axial motion along the axis of the feature 22a. The feature 22b may receive a pin from the sensor 14, preventing motion in all directions except for vertical axial motion out from the feature 22b. The feature 22c may prevent rotation of the sensor 14, and may ensure that the sensor 14 designed to mate with the feature 22a is not improperly placed in the feature 22c. That is, the sensor mount 26 and the roof mount 20 may include any combination of the features 22a, 22b, 22c to ensure that the sensors 14 are aligned upon installation and that the sensors 14 are fitted to their respective datum features 22 and only their respective datum features 22.

Figure 7:
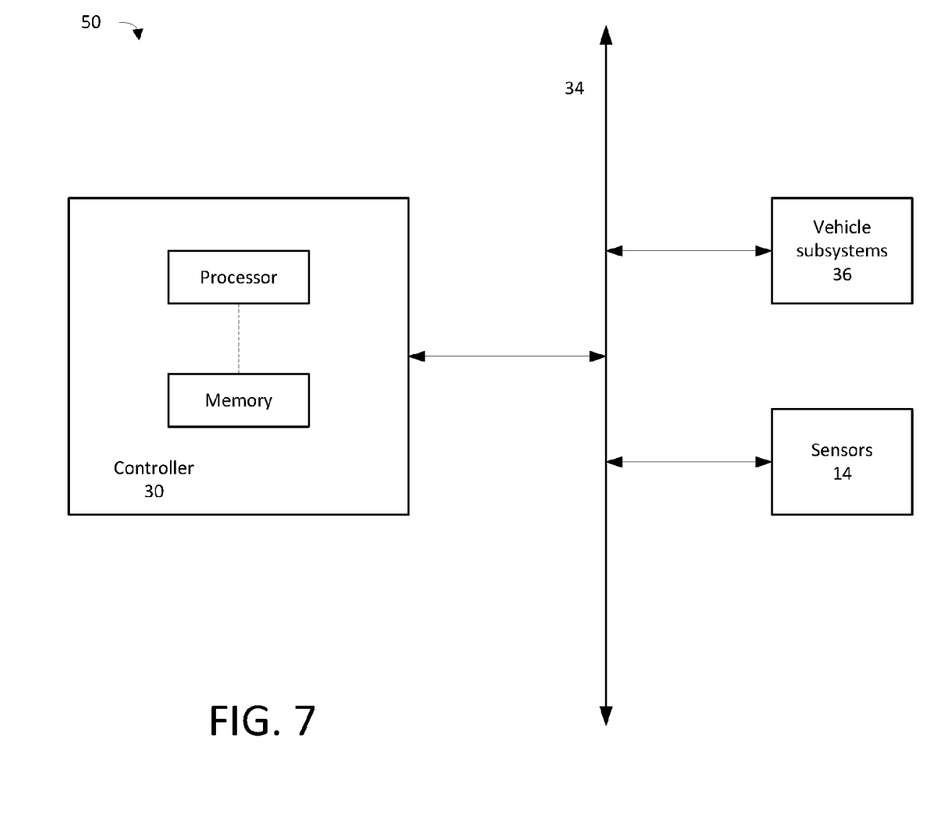
FIG. 7 is a block diagram of an example vehicle.

FIG. 7 illustrates a block diagram of the vehicle 50. The sensors 14 are communicatively coupled to a controller 30 including a processor and a memory, and vehicle subsystems 36 via a communications bus 34, such as a controller area network (CAN) bus, of the vehicle 50.

The controller 30 may be programmed to receive information collected by the sensors 14 and transmitted over the communications bus 34 to actuate the vehicle subsystems 36 to operate the vehicle in an autonomous mode. The memory may store instructions executable by processor to actuate the vehicle subsystems 36.

The vehicle subsystems 36 may include, e.g., data collectors, throttle, braking, steering, entertainment, human-machine interface, etc. The vehicle subsystems 36 may receive instructions from the controller 30 and/or a vehicle operator to operate the vehicle. The vehicle subsystems 36 may be operated in an autonomous mode.

Figure 8:
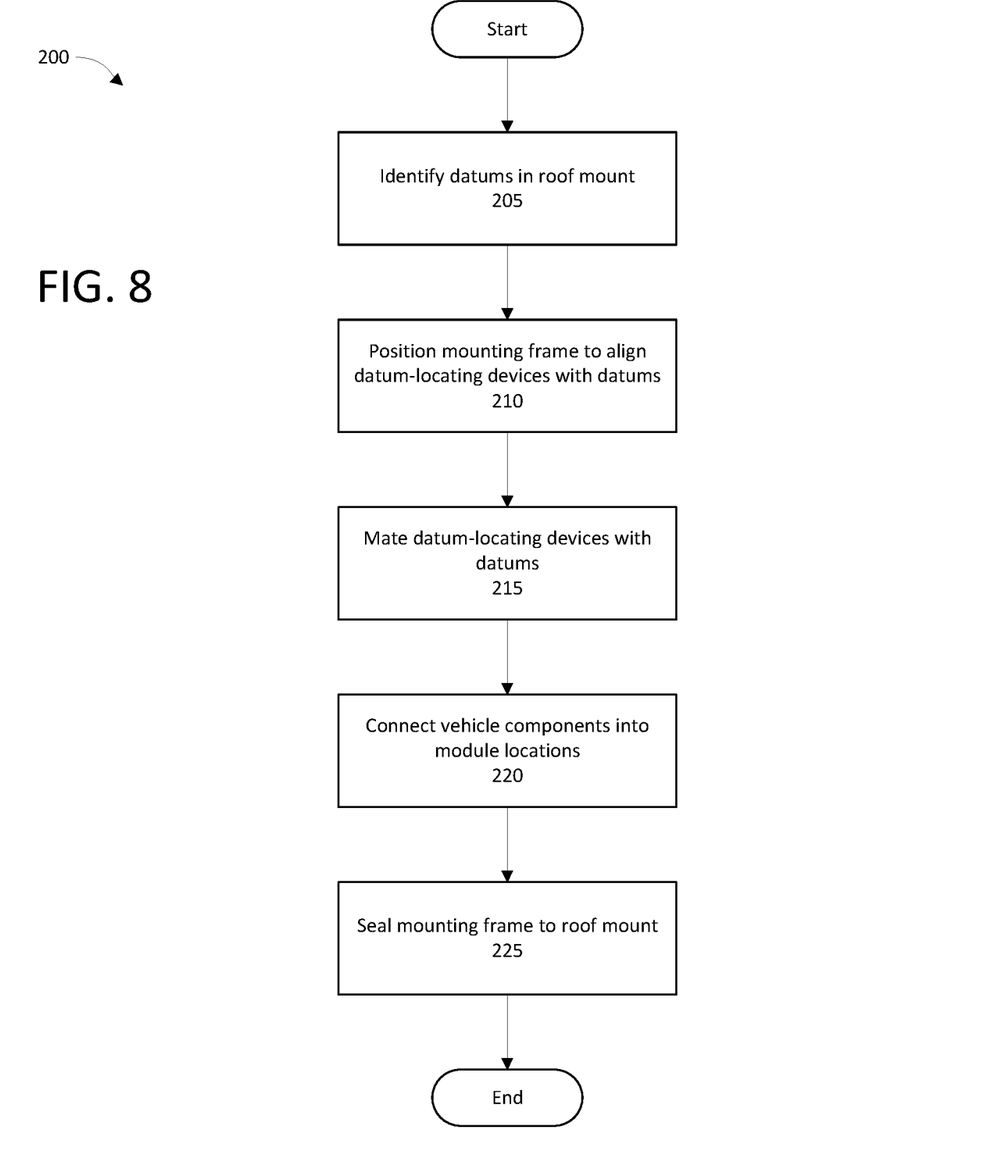
FIG. 8 is an example process diagram of a method for installing the sensors into the roof mount.

FIG. 8 illustrates an example process 200 for installing the sensor frame 12 into the roof mount 20. The process 200 begins in a block 205, in which the datum features 22 in the roof mount 20 are identified. For example, this identification could be done by an installer that is, e.g., a robot arranged to manufacture the vehicle 50, a human worker, etc.

Next, in a block 210, the installer positions the sensor frame 12 to align the feature-locating elements 16 with the datum features 22. The datum features 22 are arranged to receive the feature-locating elements 16 and to allow the installer to orient the sensor frame 12 within the roof mount 20 so that the sensors 14 are aligned with the vehicle body 52. The installer may position the sensor frame 12 above the roof mount 20 in a top-load, as shown in FIGS. 2-3, or may position the sensor frame 12 beneath the roof mount 20 in a bottom-load, as shown in FIG. 4.

Next, in a block 215, the installer mates the feature-locating elements 16 with the datum features 22. The mating may be, e.g., press-fitting the feature-locating elements 16 into the cavities of the datum features 2, installing threaded fasteners securing the feature-locating elements 16 to the datum features 22, etc. Upon mating of the feature-locating elements 16 with the datum features 22, the sensors 14 are aligned with the vehicle body 52.

Next, in a block 220, the installer connects vehicle components to the module locations 28. The roof mount 12 may include module locations 28 for various vehicle components, e.g., a wiring harness and/or a thermal management interface, and the installer may install the components into the module locations 28.

Next, in a block 225, the installer seals the sensor frame 12 to the roof mount 20, and the process 200 ends. The seal may be a urethane seal and/or a rubber seal. The seal secures the sensor frame 12 to the roof mount 20, maintaining the alignment of the sensors 14 with the vehicle body 52.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. An assembly, comprising:
a vehicle roof mount including a plurality of first physical structures, each first physical structure provided according to a respective specified location on the vehicle roof mount;
a sensor frame mateable to the vehicle roof mount including a plurality of second physical structures, each second physical structure of the sensor frame mateable to a respective one of the first physical structures of the vehicle roof mount, and a sensor;
wherein each specified location is determined to preserve a predetermined orientation of the sensor with respect to a vehicle body when the first physical structures are mated with the second physical structures.

2. The assembly of claim 1, wherein the second physical structures are arranged to position the sensor frame on the roof mount and to constrain one or more degrees of freedom.

3. The assembly of claim 1, wherein the sensor frame includes a sensor mount, and the sensor mount includes a first physical structure disposed on the sensor mount, and the sensor includes a second physical structure, the first physical structure of the sensor mount provided to preserve a specified orientation of the sensor with respect to the sensor mount when the first physical structure is mated with the second physical structure.

4. The assembly of claim 1, wherein the sensor frame is arranged to top-load into the roof mount.

5. The assembly of claim 1, wherein the sensor frame is arranged to bottom-load into the roof mount.

6. The assembly of claim 1, wherein the roof mount further includes a cavity, and the sensor frame is fittable within the cavity.

7. The assembly of claim 1, the sensor frame further comprising at least one module location.

8. The assembly of claim 7, wherein the module location is arranged to receive at least one of a thermal management interface and a wiring harness.

9. The assembly of claim 1, wherein the sensor is at least one of radar, lidar, and a vision system.

10. A vehicle roof, comprising:
a roof mount including a plurality of first physical structures, each first physical structure provided according to a respective specified location on the vehicle roof mount;
a sensor frame including at least one sensor mount;
a plurality of second physical structures disposed on the sensor frame, each second physical structure of the sensor frame mateable to a respective one of the first physical structures of the roof mount; and
at least one sensor supported by the sensor mount;
wherein each specified location is determined to preserve a specified orientation of the sensor with respect to a vehicle body when the first physical structures are mated with the second physical structures.

11. The roof of claim 10, wherein the sensor frame is arranged to top-load into the roof mount.

12. The roof of claim 10, wherein the sensor frame is arranged to bottom-load into the roof mount.

13. The roof of claim 10, wherein the sensor frame further includes at least one module location arranged to receive at least one of a thermal management interface and a wiring harness.

14. The roof of claim 10, wherein the roof frame further includes a cavity, and the sensor mount is fittable within the cavity.

\* \* \* \* \*

UNITED STATES PATENT AND TRADEMARK OFFICE
CERTIFICATE OF CORRECTION

PATENT NO. : 10,046,713 B2
APPLICATION NO. : 14/986841
DATED : August 14, 2018
INVENTOR(S) : Clay Wesley Maranville et al.

Page 1 of 1

It is certified that error appears in the above-identified patent and that said Letters Patent is hereby corrected as shown below:

In the Claims

Column 7, in Lines 24-25, replace "wherein the roof frame further includes a cavity, and the sensor mount is fittable" with -- wherein the roof mount further includes a cavity, and the sensor frame is fittable --.

Signed and Sealed this
Eighteenth Day of June, 2019

Andrei Iancu
*Director of the United States Patent and Trademark Office*